United States Patent [19]

Young

[11] 4,334,906
[45] Jun. 15, 1982

[54] SLOW RELEASE SOIL AMENDMENT AND MICRONUTRIENT SOURCE

[75] Inventor: Donald C. Young, Fullerton, Calif.

[73] Assignee: Union Oil Company of California, Los Angeles, Calif.

[21] Appl. No.: 211,205

[22] Filed: Nov. 28, 1980

Related U.S. Application Data

[63] Continuation of Ser. No. 134,021, Mar. 25, 1980, abandoned, which is a continuation of Ser. No. 962,165, Nov. 20, 1978, abandoned, which is a continuation of Ser. No. 569,484, Apr. 18, 1975, abandoned.

[51] Int. Cl.$^3$ ............................................. C05D 11/00
[52] U.S. Cl. ........................................ 71/33; 71/50; 71/53; 71/63; 71/64.6; 71/64.11; 71/64.13
[58] Field of Search ..................... 71/1, 31, 53, 60, 63, 71/64 R, 64 A, 64 D, 64 DB, 64 E, 64 F, 64.6, 64.11, 64.13, 33, 36, 47, 50, 51, 264/11, 13, 14

[56] References Cited

U.S. PATENT DOCUMENTS

| | | | |
|---|---|---|---|
| 2,983,594 | 5/1961 | Jost | 71/1 |
| 2,988,439 | 6/1961 | Gloss | 71/1 |
| 3,560,192 | 2/1971 | DiCicco | 71/1 |
| 3,666,523 | 5/1972 | Nau | 71/64 DB |
| 3,769,378 | 10/1973 | Young et al. | 264/14 |
| 3,951,639 | 4/1976 | Windgassen | 71/1 |

OTHER PUBLICATIONS

Fertilizer Technology and Use, Olson, 1971, Second Edition, 344, 345, Soil Science of America, Madison, Wisconsin.

Sharpee, Ludwick, and Attoe, "Availability of Zinc, Cooper, and Iron in Fusions with Sulfur," Agronomy Journal, vol. 61, Sep.-Oct. 1969, pp. 746-749.

*Primary Examiner*—Ernest G. Therkorn
*Attorney, Agent, or Firm*—Robert A. Franks; Dean Sandford; Michael H. Laird

[57] ABSTRACT

Particulate, easy to handle, inexpensive combination soil amendments and micronutrient sources are disclosed along with methods for their manufacture and use. These compositions comprise highly porous sulfur particles having substantial internal surface area with the micronutrient source dispersed either throughout the sulfur matrix or over the interior surfaces. Major plant nutrients including nitrogen, phosphorus and potassium can also be added but are not essential. These methods allow the use of inexpensive, abundant starting materials, afford slow release sulfur and micronutrient solubility and mobility, reduced micronutrient loss by elution, and minimum ground water pollution and plant toxicity problems associated with heavy metal contamination.

12 Claims, 3 Drawing Figures

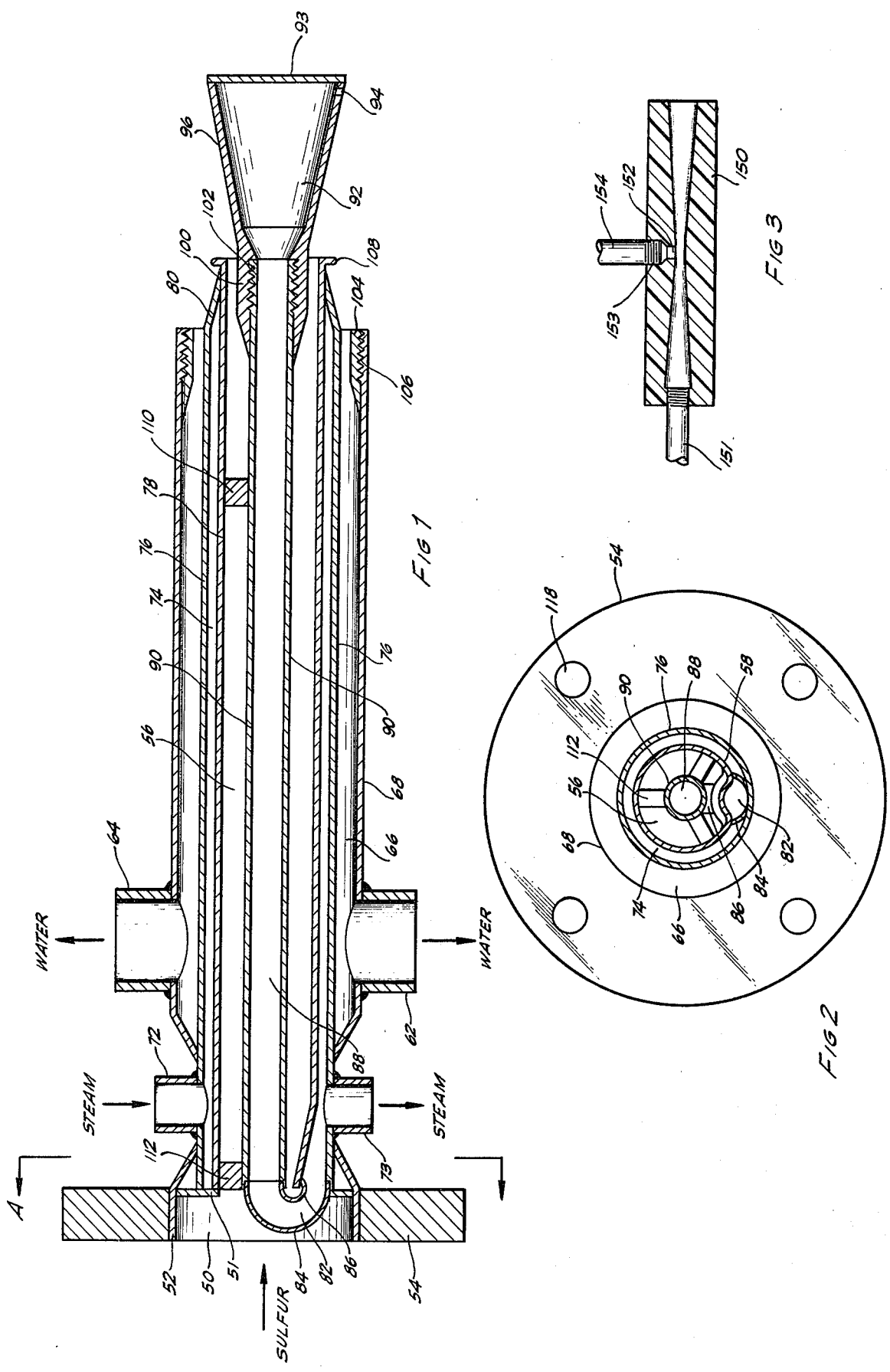

SLOW RELEASE SOIL AMENDMENT AND MICRONUTRIENT SOURCE

CROSS REFERENCE TO RELATED APPLICATIONS

This application is a continuation of Ser. No. 134,021, filed Mar. 25, 1980, now abandoned, which was a continuation of Ser. No. 962,165 filed Nov. 20, 1978, now abandoned, which was a continuation of Ser. No. 569,484, filed Apr. 18, 1975, now abandoned.

BACKGROUND OF THE INVENTION

Elemental sulfur and micronutrient elements have known utility as soil amendments and plant nutrients. However, contemporary application techniques result in the unavoidable micronutrient loss due to elution by irrigation or rain water. This loss occurs when the micronutrient metals are added as or converted to soluble forms which can be dissolved and drawn into the soil along with water movement and thus beyond the levels with which they are available as plant nutrients. This migration, particularly of boron and the heavy metals such as zinc, copper, molybdenum and manganese, has recently been associated with the pollution of ground water and streams. Furthermore, if present in excess, these materials accumulate at toxic levels in treated plants.

Obviously, however, these metals must be applied in soluble forms or as compounds that can be converted to soluble forms to assure their availability to the crop. Thus it is necessary to strike a balance between the mobility and immobility of these materials in order to, on the one hand, afford their availability to the crop at the desired rate while avoiding toxic accumulations in the plants, ground water pollution or, simply, excessive micronutrient loss to the ground water.

The problem is further complicated by the influence of soil composition per se on compound mobility. For instance, many of these compounds and particularly the more abundant less expensive compounds such as the oxides, hydroxides, sulfides and carbonates are only slightly soluble at best under conditions of application. Their solubility is even further reduced in basic, calcareous soils thus requiring high application rates to assure availability.

This problem might be overcome to some extent by changing the gross soil chemistry, i.e., by adding sufficient acid to increase soil pH and improve micronutrient mobility. It might also be possible to combine the micronutrient compounds with a composition such as elemental sulfur or ammonium nitrate which might reduce soil pH locally, i.e., in the immediate vicinity of the sulfur or ammonium nitrate particle thereby increasing micronutrient mobility by either simply lowering soil pH or possibly even converting the compound to a more soluble form, e.g., the sulfate. While this procedure would have the advantage of increasing metal availability, it suffers from the disadvantage that the micronutrient compound, once mobilized, could be readily swept out of the immediate vicinity of the plants by irrigation or rain water. This condition exists even if the compound is applied on the surface of the soil amendment (sulfur, ammonium nitrate, etc.) since those surfaces would be periodically washed by water applied to the soil.

It is therefore one object of this invention to provide an improved combination soil amendment and slow release micronutrient source. It is another object to provide a particulate, highly porous combination of elemental sulfur and plant micronutrients. Another object is the provision of a porous, particulate sulfur-micronutrient combination which acts as a slow release micronutrient source and is particularly adapted to improving the availability of micronutrients in calcareous soils while reducing micronutrient loss. It is another object to provide a composition and method for making micronutrients available to plant crops at a controlled rate while minimizing micronutrient loss in the ground water or the accumulation of excessive micronutrient levels in the plant crop.

These objectives are accomplished by combining the micronutrient with highly porous sulfur particles having substantial internal surface area so that a substantial amount, and preferably a principal amount, of the micronutrient is located either within the sulfur matrix or on the interior surface area of the sulfur particle. These combinations expose a higher surface area, for a given weight of sulfur and micronutrient, on which elemental sulfur and the micronutrient are intimately associated and are exposed to oxidizing action. I have found that the mobile forms of micronutrient created or maintained in this environment immediately adjacent the interior surface area are not immediately swept away by elution due to irrigation or rain water penetration. On the contrary, the nutrients are retained within the interior of the sulfur particle.

The benefit of increased surface area might be obtained within finely divided sulfurs of smaller particle size. Unquestionably, similar surface areas could be obtained. However, aside from the problems of handling fine powders, the increased surface area would be present at the exterior of the sulfur particles. Thus any mobile micronutrient compound could be readily eluted by ground water. The mobile micronutrients would be readily swept past the effective zone of plant nutrition and lost or, if made available to the plants upon the addition of water by irrigation or rain, would result in a slugging effect, i.e., the induction of high concentrations of micronutrients into the crops on a periodic basis depending on the irrigation and/or rain cycles.

Therefore, in accordance with one embodiment of this invention, improved slow release soil amendments and micronutrient sources are produced by impregnating porous sulfur particles having an internal pore volume of at least about 0.04 cc per gram and an internal surface area of at least about 20 square centimeters per gram, with an aqueous solution of a water soluble micronutrient compound. The solution is preferably concentrated so that the impregnation step will require as little water as possible. Concentrated solutions allow more efficient solution use. Desired micronutrient levels can be reached by applying only the amount of solution required to either fill the pores of the sulfur particles or introduce the required amount of micronutrient, whichever is less.

In a preferred embodiment, the micronutrient metal or compound is incorporated into the sulfur particles by combining molten sulfur with the metal or a water soluble compound and thereafter converting the combination to the porous particulate form. A preferred procedure for this conversion is described in my U.S. Pat. No. 3,769,378 and, in essence, involves mixing high velocity streams of water and molten sulfur in a turbulent zone created by the intersection of the two streams.

Apparatus suitable for producing the sulfur particles as illustrated in the accompanying drawings of which FIG. 1 is a side sectional view of a preferred sulfur-water mixing apparatus;

FIG. 2 is a sectional view taken along the axis of the gun at section A-A and

FIG. 3 is a side sectional view of an alternative mixing apparatus.

While the forms of apparatus illustrated in the drawings and described specifically herein are preferred means of producing the porous sulfur particles, they are, of course, not the only means of accomplishing this objective. It is essential only that means be provided to form high velocity streams of molten sulfur and water and to align these two streams such that they intersect and produce a highly turbulent zone within which the molten sulfur is "captivated" and completely surrounded by water. The turbulence thus created breaks the molten sulfur up into very small particles and, by a procedure not fully understood, results in the formation of highly porous particles of non-dusting sulfur. The sulfur and water streams can be sprayed either into the open atmosphere or into a closed container, with the spray being directed to place the resultant particles in the desired location. As a practical matter a longitudinal distance of at least about 20 feet should be provided between the end of the sulfur and water guns and the storage area so as to provide sufficient time for completely solidification of the sulfur before it contacts any surface or other sulfur particles.

Preferred devices are those which provide the following conditions: The water gun should have a constriction discharge nozzle to provide a water stream having a relatively high velocity on the order of about 3 to about 9 feet per second sufficient to form a spray having a vena contracta at a distance from the end of the barrel about 0.2 to about 15 pipe diameters downstream of the nozzle. The sulfur gun should also have a nozzle sufficient to provide a longitudinal velocity of about 3 to about 90 linear feet per second, and should be aligned to intersect the water stream within the area of the vena contracta at an angle of about 0 to about 20 degrees to the longitudinal axis of the water stream.

These conditions would generally be sufficient to captivate and disperse the sulfur within the water stream without allowing penetration of the water phase by the molten sulfur. Obviously the relative sulfur and water flow rates must be controlled at a level sufficient to provide adequate cooling and dispersion of the molten sulfur. Accordingly, this system should be operated at a water flow rate corresponding to at least about 0.6 weight part water per weight part sulfur, sufficient to disperse the molten sulfur stream into fine droplets and to cool and solidify those droplets into porous sulfur particles. Preferred water rates are about 0.6 to about 10 weight parts water per weight part sulfur. Water rates substantially above the upper limit generally result in no substantial benefit and serve only to increase operating cost. When the longitudinal axes of the sulfur and water guns are aligned at the same angle, i.e., an intersection angle of zero degrees corresponding to the lower limit of the preferred range, it is necessary that the constriction discharge nozzles of the water and sulfur guns be coaxial as illustrated in FIG. 1. Other intersect angles can be obtained by using separate water and sulfur guns, each of which can be aligned at an angle that will provide for intersection of the two streams in an area sufficient to captivate and disperse the sulfur into finely divided porous particles.

Operating conditions are preferably controlled to prevent the formation of substantial amounts of steam upon contact of the water and the sulfur media. Thus, relatively low water and sulfur temperatures are preferred. Ambient temperatures are suitable for the water stream although any temperature below the water boiling point can be employed provided that the relative water and sulfur rates are sufficient to combat excessive water flashing. Relatively low sulfur temperatures are preferred for the same reason. Additionally, however, sulfur temperatures above about 340° F. should be avoided due to the dramatic increase in viscosity that occurs at temperatures significantly above this level. The presently preferred method involves the use of sulfur temperatures only slightly above the sulfur melting point.

Referring now to FIGS. 1 and 2, the prilling device used in carrying out the method comprises a set of concentric conduits 68, 76, 78 and 90 which are secured to flange 54 having radially spaced bolt holes 118. Secured in the base of flange 54 is a sleeve 52 which has one end rolled into a frusto-conical shape and is welded to the outer surface of conduit 76. Ring 51 is mounted within sleeve 52 and the ends of conduits 76 and 78 are butt welded to the ring. The inner conduit 90 is supported by conduit 78 with spacers or lugs 110.

The annular passageway 74 between conduits 76 and 78 is in communication with the inner conduit 90 by the U-shaped conduit 84 which fits into an annular seat about the inner periphery of conduit 90. The under surface of conduit 78 is crimped slightly and a semi-circular cut is made in ring 51 to define an opening 82 (see FIG. 2) into which is fitted the remaining end of U-shaped conduit 84 which thereby provides communication between annular passageway 74 and conduit 90.

Conduit 68 has one end rolled into a frusto-conical shape which mates with and is welded to the outer periphery of conduit 76 at a point downstream of sleeve 52 to provide an assembly having a neck of reduced diameter. Nozzles 72 and 73 are carried by conduit 76 at this neck portion to provide communication with annular passageway 74. Nozzles 62 and 64 are carried by conduit 68 to provide communication with annular passageway 66 defined by conduits 68 and 76.

At its opposite end, conduit 68 is opened. Preferably, a nozzle 104 is formed by a sleeve secured to the inner periphery of conduit 68 to reduce its diameter and provide an annular orifice, thereby serving as a discharge nozzle. Nozzle 104 can be permanently attached to conduit 68 or, as shown, can be removably attached by threaded joint 106. If desired, nozzle 104 can have an arcuate inner surface to define a smoothly converging entrance to the annular orifice or, as shown, can have a simple conically tapered entrance.

The end of conduit 76 is rolled into a frusto-conical shape and is welded to conduit 78 to close annular passageway 74. Conduit 78 is open-ended and bears an annular lip 108. Conduit 90 supports a conical member 96 having a hollow neck 100 that fits over conduit 90 and is removably secured thereto by threads 102. Alternatively, neck 100 could be permanently welded to conduit 90. Neck 100 parts obstructs the open end of annular passageway 56 and thereby serves as a discharge nozzle. As with nozzle 104, the nozzle which is thus formed by neck 100 can have a smoothly converging throat by shaping the outer surface of neck 100 into an arcuate path along the longitudinal axis or, as shown, the inner end of neck 100 can simply be tapered. Conical member 96 is preferably hollow and closed with end cap 93 to define a chamber 92 that is in communication with conduit 90. One or more holes 94 are bored through the underside of conical member 95.

In operation, sulfur flows into an annular passageway 56 as shown in FIG. 1. The sulfur is maintained in a molten condition by indirect heat exchange means. These means comprise conduits 76 and 90 which define annular passageway 74 and central passageway 38 for a heating fluid which is preferably steam. Steam flows into nozzle 72 through annular passage 74 and out passage 73.

Water is forced into nozzles 62 and 64 and through annulus 66. Nozzle 104 constricts the water discharge from passageway 66 to produce a high exit velocity. The molten sulfur flows through the passageway 56, the discharge of which is partly restricted by the nozzle formed by neck 100 to deflect the sulfur stream towards the outer water stream. The exit velocity of sulfur is increased as it is discharged through the constricted throat of the nozzle formed by neck 100 and the sulfur is thus discharged at a high velocity out of the sulfur conduit and into contact with conical member 96 which serves as a baffle and further deflects the sulfur into contact with the water stream.

Thus the molten sulfur and water are contacted in the highly turbulent region at the discharge end. The sulfur is dispersed into discrete droplets presumably containing some water. The sulfur is solidified in the atmosphere by the joint action of water and air.

The sulfur particles and water carry as a combined stream and fall onto a storage area. The water readily drains from the sulfur particles leaving a bulk amount of dry, porous sulfur prills.

Blending can occur if the discharges are substantially parallel and in close proximity. Thus, it has been found that if the conduit 76 is eliminated, the streams will blend without conical deflector 96.

The water conduit is shown in FIG. 1 as terminating a minor distance, e.g., 1–10% of the length of the conduit, prior to termination of the sulfur conduit. This factor, in combination with lip 108, prevents sulfur from flowing into the water conduit and plugging any portion of the discharge of the water passageway during shutdown of the device. Alternatively, conduit 68 can be extended to terminate substantially at the same point along the longitudinal axis as the conduit 78 to improve mixing of the water and sulfur streams.

As described hereinabove conical member 96 deflects the sulfur stream into contact with the water stream. Some of the water stream also impinges against deflector 96 and, in this manner, intimate contact is insured. The side walls of member 96 can be inclined from the longitudinal axis of the device from 3° to about 35°, preferably from 5° to about 25°, with the length of the conical member 96 correlated with its sidewall angle to achieve the above objectives. This angle should not be great enough to impart a radial velocity vector to the sulfur sufficient to penetrate through and escape from the water stream. It is also preferred that the sidewall angle and/or length of the conical member be such that at least a substantial amount, e.g., 40–100 percent, preferably 70–100 percent, of the water stream is not deflected. This retains a substantial velocity of the combined streams useful in conveying and distributing sulfur to the storage location. To achieve this objective, the diameter of the base of conical member 95 and the position of member 96 are selected so that the base does not extend into the longitudinal extension of annular passageway 66. The angle and length of member 96, as well as the sulfur and water-exit velocities, affect the mixing of water and sulfur and the properties of the sulfur prills. The properties of the sulfur particles can be varied by using conical members of varied length and inclination angles.

Steam is introduced into the prilling device in sufficient quantity and/or superheat to insure that the sulfur is retained in the molten state as it flows through the prilling device. Steam flows into passageway 74 defined by pipes 76 and 78 through space 82 defined by U tube 84 into passageway 68 defined by conduit 90. The steam also flows through conduit 90 and into conical member 96 to insure that the sulfur does not solidify on and adhere to the exterior of conical member 96. Condensate is removed through nozzle 73 and through bore 94 in conical member 96.

Alternatively, steam may be introduced directly into passageway 88 by a nozzle communicating with conduit 90. In this manner sulfur is heated only from the interior of the device and the water conduit is in direct communication with the sulfur conduit with no intervening steam jacket. This embodiment has the advantage that better mixing of the sulfur and water stream can be achieved at the exit end of the device in that there is a minimum of area separating the respective streams as they flow out of the prilling device.

FIG. 3 illustrates an alternative mixing device comprising nozzle 150 having a tapped entrance into which conduit 151 is secured and an orifice 152 communicating with tapped bore 153 to which conduit 154 is secured. Conduit 151 can be attached to a pressured water supply and conduit 154 communicates with a molten surface source.

The entire assembly can be heated, e.g., electric heating tape can be wrapped about the nozzle and conduit 154. Alternatively, only conduit 154 can be heated by steam or heating tape tracing.

The principal variables effecting the sulfur product are the absolute and relative steam velocities and mass flow rates. The water and sulfur velocities are determined by mass flow rate and nozzle cross-section. In general the above variables are correlated with one another within the following preferred ranges to produce a sulfur particle having the desirable properties of high porosity and surface area and ease of grindability discussed hereinafter. The following Table summarizes the ranges of variables.

TABLE 1

| | Broad | Intermediate | Narrow |
|---|---|---|---|
| Exit water velocity, feet/sec | 3–90 | 10–60 | 25–45 |
| Exit sulfur velocity, feet/sec | 3–90 | 10–60 | 25–45 |
| Ratio, water velocity/sulfur velocity | 0.4:1–20:1 | 0.5:1–5:1 | 0.7:1–2:1 |
| Ratio, water mass flow rate/sulfur mass flow rate | 0.2:1–20:1 | 0.6:1–10:1 | 0.7:1–5:1 |

At low relative flow rates, the sulfur quickly solidifies without entrapping water and a dense particle may be produced. Additionally, the absolute and relative sulfur and water velocities must be sufficient to form a turbulent region outside the conduits to mix the sulfur and water and contain the sulfur within the water stream or in intimate contact therewith as the streams flow through the atmosphere. The water velocity, however, should not be too high as it has been found that higher water velocities tend to increase the fines production which may or may not be desired.

The preferred sulfur particles have bulk densities of about 1.9 or less, generally about 1.3 grams per cc or less, preferably about 0.9 to about 1.3 grams per cc. Particle porosities should be at least about 0.04, generally about 0.04 to about 0.15 cc per gram. Internal surface area should be at least about 20 and preferably between about 30 and 100 square centimeters per gram.

The prilling methods and apparatus described above are very suitable for producing sulfur particles having these characteristics. Nevertheless, the combination slow release micronutrient and soil amendments of this invention can be produced from essentially any sulfur particles having the required internal surface area accessible to either aqueous solutions or ground water. Thus, the particles should have open, as opposed to closed, pores in order to allow migration of the micronutrients from the interior of the sulfur particle.

The micronutrient elements are well known and include magnesium, manganese, solybdenum, boron, copper, iron and zinc. These materials can be present either as the metals or as soluble or insoluble compounds in agronomically effective amounts. Optimum concentrations are functions of several variables such as toxicity and preferred plant dose, general plant needs for specific nutrients, and the like. Certain nutrients such as molybdenum are generally added at low levels on the order of 0.01 weight percent or more. However, total nutrient levels will usually correspond to at least about 0.1 and preferably between about 0.2 to about 10 weight percent determined as the metal based on the combined weight of the micronutrient and sulfur.

The compounds can be either soluble or insoluble. However, compounds which are either insoluble or are converted to water insoluble materials in molten sulfur are presently preferred. The insoluble compounds can be added directly to the sulfur in the prilling operation described above. Thus, as opposed to the alternative impregnating approach, the use of insoluble compounds eliminates a manufacturing step and yields a product in which the micronutrient is evenly dispersed throughout the sulfur matrix. The nutrient is thereby released to the soil at a slow, controlled rate depending upon the rate of sulfur oxidation.

The micronutrient metals and/or metal compounds incorporated either by impregnation or dispersion in the sulfur matrix are those which are either soluble in the ground water or converted to soluble forms in the acidic environment created in the immediate vicinity of the sulfur surface in the soil. Even though some of these materials, i.e., molybdenum, do not easily form the corresponding sulfates, they are nevertheless rendered soluble at low pH created by oxidation of the sulfur and formation of sulfuric acid.

The rate of micronutrient solubilization and migration in the soil, i.e., mobility, can be evaluated by any one of numerous procedures ranging from actual field trials to accelerated laboratory oxidation tests. One such test involves heating the micronutrient-sulfur combination in flowing air at 200° F. for 20 hours. An amount of water equal to the weight of the sulfur is then mixed with the sulfur particles and agitated for two hours at 150° F. The sulfur particles are removed by filtration and the solution is analyzed for the presence of micronutrient elements by conventional analytical techniques.

The soluble compounds used in the impregnating technique can be characterized as those being soluble to the extent of at least 5 grams, preferably at least about 30 grams per 100 ml water at 70° F. at a pH of 7 or below. Whether or not a given compound has this degree of solubility can be readily determined by observing the extent to which it dissolves under these conditions. Essentially any compound having this degree of solubility and being non-toxic to plants under the conditions existing in the soil can be employed for this purpose. However, the more soluble materials, i.e., those having solubilities of at least about 30 grams per 100 ml water at the above-described conditions are presently preferred due to the smaller amounts of water involved in their application. Smaller solution quantities simplify draining and drying procedures and reduce runoff and micronutrient loss or recycling. Illustrative compounds include magnesium acetate, dibasic citrate, ammonium sulfate, nitrate, sulfate and thiosulfate; manganese acetate, hypophosphite, monobasic phosphate, sulfate, ammonium sulfate and nitrate; molybdenum trisulfide, ammonium molybdate in concentrated phosphoric acid (pH below about 3), molybdenum blue; ammonium borate, $B_2O_3$, $B_2O_3.3H_2O$; cupric acetate, ammonium chloride, nitrate and sulfate; feric nitrate; ferrous oxalate, thiosulfate, sulfate and ammonium sulfate; and zinc acetate, ammonium sulfate, formate, nitrate, sulfate, chloride and dithioate, ammonium sulfate, and the like.

Preferred solutions are at least 50 percent, preferably at least 70 percent saturated at 100° F. The particulate products contain at least 50 and preferably at least about 70 percent of the micronutrient deposited on the interior or inside the pores of the sulfur particles.

The solutions can be applied to the porous sulfur particles immediately after their preparation by the procedures described above. However, I have observed that much better results are obtained if the sulfur particles are allowed to age in an oxidizing atmosphere, e.g., ambient air, for a period sufficient to increase their affinity for the micronutrient solutions. It appears that this increase in affinity is a consequence of surface oxidation of the sulfur particles. Nevertheless, the effect is illustrated by a more rapid uptake of the aqueous solutions by sulfur particles which have been allowed to age somewhat prior to impregnation. This effect will occur under very mild conditions and can be observed by ageing at temperatures as low as 30° F. for periods of one hour or more which result in increased wettability of the particle surface.

Impregnation effectiveness can also be improved, or for that matter, the need for preoxidation of the sulfur surface can be eliminated, by adding a small amount, e.g., at least about 0.1 and preferably a least about 0.2 weight percent of a surfactant to the micronutrient solution. Numerous surfactants are effective for this purpose, their essential characteristic being their ability to reduce water surface tension thereby enabling the more rapid and complete penetration of the sulfur.

Thus in the preferred impregnation method, the sulfur particles formed as described above are allowed to drain substantially free of water, i.e., to a water content of less than about 5 weight percent, and are exposed to ambient air for a period of at least about one hour. The particles are then impregnated with an amount of a micronutrient solution, at least 50 percent saturated with the selected micronutrient or combination of micronutrients. The amount of solution applied is preferably just sufficient to saturate the interior pore volume of the sulfur particles. Lesser amounts of solutions having higher micronutrient concentrations can be used although the amount of solution should be sufficient to afford even distribution throughout the particle mass. Similarly, the quantity of solution should not substantially exceed the pore volume of the sulfur particles. Any excess will simply run off and may result in waste of micronutrients. However, excess solution can be accumulated and recycled if desired. Impregnation with the less soluble compounds can be effected by repeated impregnating cycles or, conversely, the solubility of these compounds can be increased by increasing solution temperature or reducing solution pH by the addition of a mineral acid such as sulfuric, hydrochloric, nitric and phosphoric acids, or water soluble organic acids such as acetic, formic acids and the like.

In the second embodiment the micronutrients are dispersed throughout the sulfur matrix either as finely divided elemental metals or finely divided soluble or insoluble compounds thereof. The elemental metals or water insoluble compounds are presently preferred due to the fact that these materials are not leached out of the sulfur matrix during manufacture of the porous particles in the preferred methods described above.

The micronutrient metals or compounds are incorporated into a molten sulfur phase in the desired concentrations after which the mixture is formed into particles. In the preferred prilling method described above, this involves contacting the molten sulfur with substantial amounts of water. I have observed that the micronutrient compounds exhibiting substantial water solubility are leached out of the sulfur matrix at a very rapid rate during this procedure. Thus if the sulfur particles are to be formed by contacting with water, the micronutrient should be present in the molten sulfur phase either as finely divided metals or as water insoluble compounds.

Within the context of this invention the term "water insoluble compounds" is intended to encompass those being soluble in water to the extent of less than 10, preferably less than 5 grams per 100 ml water at 70° F. and a pH of 7. This does not necessarily require that the compound added to the molten sulfur phase is itself water insoluble. On the contrary, a number of compounds of the above-described micronutrient elements although water soluble themselves, are rapidly converted to water insoluble forms, e.g., the sulfides, in the presence of sulfur at temperatures above the sulfur melting point. For instance, zinc acetate ammonium molybdate, manganese acetate, magnesium acetate, zinc chloride, magnesium ammonium sulfate, copper acetate, cupric ammonium chloride, ferrous oxalate, and numerous others convert to the relatively insoluble corresponding sulfides in molten sulfur. As a practical matter, if this type of in situ conversion is desired, the compound should be one that converts to the corresponding sulfide in molten sulfur in a reasonable period of time, i.e., less than about one hour.

Illustrative insoluble starting compounds are the metal borates, sulfides, carbonates, silicates, oxides, phosphides and the like, the preferred materials being the oxides, sulfides and carbonates due to their insolubility, availability and relatively low cost. Illustrative insoluble or only slightly soluble compounds are the metal borates, $B_2O_3$ (non-hydrated) boron phosphide, magnesium ammonium phosphate, borate, carbonate, hydroxide, oxides, di- and tribasic and pyrophosphates, magnesium orthophosphite, silicate, sulfide, sulfite and calcium magnesium carbonate; manganese ammonium phosphate, carbonate, hydroxides, oxides, silicate, sulfides, formate, boride, molybdenum di- and tetrasulfides, molybdenum oxides, calcium molybdate; cupric and cuprous carbonates, hydroxides, oxides and copper oxalate, phosphate, orthophosphite, phosphide and cupric and cuprous sulfides, ferric acetate, hydroxide and oxide; iron phosphates, pyrophosphates, sulfides, silicates, sulfates; zinc hydroxide, oxide, phosphates, silicates, carbonates, sulfides, and the like.

The metals or compounds should be incorporated into the sulfur melt at a temperature of between about 220° and 340° F. in the finely divided form. As mentioned above, when water soluble compounds convertible to insoluble sulfides are used these compounds should be suspended in the sulfur for a period sufficient to convert them to the corresponding sulfides.

These compositions are particularly suitable for use with "basic" compounds, i.e., compounds which are more soluble at lower pH levels. They are especially suitable for use with compounds that are more soluble at pH levels below about 7. Secondly, they promote the mobility of either "basic" compounds or even highly soluble compounds in basic, calcareous soils. Calcareous soils, so named due to the presence of substantial calcium carbonate levels often generate basic conditions corresponding to pH levels above 7, sometimes on the order of 8 or above. These environments can reduce the solubility and mobility of compounds that would be soluble at lower pH levels. However, due to the relatively high internal surface area of these compositions and the maintenance of an acidic environment in the particle interior, the micronutrients are maintained in a more mobile form and/or environment even in basic soils without the necessity of modifying soil pH generally. Thus they are made available at a gradual controlled rate and yet cannot be completely eluted from the root zone by irrigation or rain water due to the shielding effect of the porous sulfur particles.

Although micronutrient mobility is often more limited in the basic soils mentioned above, this factor is not a function of simply basic or acidic environment. It can be influenced by pH throughout the range of that variable. Thus a compound may be only slightly mobile at pH 6.5 and even more mobile at pH 2. Consequently localized pH reduction can contribute to micronutrient availability even in initially acidic environments.

I claim:

1. A combination porous particulate soil amendment and micronutrient source comprising porous sulfur particles characterized by a bulk density of about 1.9 grams per cc or less, an open pore volume of at least about 0.04 cc per gram and an internal surface area of at least about 20 cm$^2$ per gram, and containing within said particles a dispersed agronomic amount of one or more micronutrient elements.

2. The composition of claim 1 wherein the particles contain at least 0.01 percent by weight of one or more micronutrient elements, said element dispersed within the particles as the finely divided element or a compound thereof, being soluble in water at pH 7 and 70° F. to the extent of less than 5 grams per 100 milliliters.

3. The composition of claim 1 wherein a micronutrient element is selected from the group consisting of magnesium, manganese, molybdenum, boron, copper, iron and zinc, and is present in said particles either in the elemental form or in a water soluble or insoluble compound of the element; said water insoluble compound being either: (a) convertible to a water soluble sulfate; or (b) an acid soluble compound which is at least partially soluble in an acidic environment created by oxidation of sulfur particles in soil.

4. The method of improving and conditioning soil including the steps of applying to said soil an agronomically effective amount of the particulate soil amendment of claim 3.

5. The composition of claim 3 wherein a soluble compound is selected from the group consisting of sulfates, ammonium sulfates, thiosulfates, sulfides, nitrates, chlorides, acetates and combinations thereof; and an insoluble compound is selected from the group consisting of borates, sulfides, carbonates, silicates, oxides, hydroxides, phosphates and combinations thereof.

6. The composition of claim 5 comprising a water insoluble, basic micronutrient compound having a higher solubility at pH values below about 7.

7. The composition of claim 6 wherein a basic micronutrient compound is selected from the group consisting of oxides, hydroxides and carbonates.

8. The composition of claim 6 wherein a micronutrient element is selected from the group consisting of zinc, boron and copper.

9. The method of improving the agronomic quality of soil which comprises combining with said soil at least about 10 pounds per acre of the porous particulate soil amendment of claim 6.

10. The method of improving and conditioning basic soil having a pH above 7 including the steps of applying to said soil an agronomically effective amount of the particulate soil amendment of claim 6.

11. The method of improving and conditioning basic soil having a pH above 7 including the steps of applying to said soil an agronomically effective amount of the particulate soil amendment of claim 3.

12. The method of producing the composition of claim 1 including the steps of (a) forming an intimate mixture of molten sulfur and one or more micronutrients; (b) producing a stream of water along a first longitudinal axis at a linear velocity of about 3 to about 90 feet per second to form a water spray having a vena contracta; (c) producing a stream of said mixture of micronutrients and molten sulfur along a second longitudinal axis aligned at an angle of about 0 to about 20 degrees to said first longitudinal axis and at a linear velocity of about 3 to about 90 feet per second and intersecting with said stream of water at, or upstream of, said vena contracta with a radial velocity vector insufficient to penetrate said water spray with said sulfur mixture, to form a single spray of said water and sulfur comprising separated sulfur droplet; and (d) controlling the relative flow rates of said water and sulfur to provide a relative mass flow rate of about 0.6 to about 10 weight parts water per weight part sulfur, sufficient to cool and solidify said sulfur droplets into porous sulfur particles.

* * * * *

UNITED STATES PATENT AND TRADEMARK OFFICE
CERTIFICATE OF CORRECTION

PATENT NO. : 4,334,906

DATED : June 15, 1982

INVENTOR(S) : DONALD C. YOUNG

It is certified that error appears in the above-identified patent and that said Letters Patent are hereby corrected as shown below:

In the drawings, Fig. 1, the arrows showing water flow through nozzles 62 and 64 should be reversed to indicate a direction of flow into the prilling device.

Column 3, line 35, change "9" to --90--.

Column 5, line 11, change "38" to --88--.

Column 6, line 1, change "95" to --96--.

Column 6, line 14, after "78", insert --and--.

Column 6, line 15, change "68" to --88--.

Column 7, line 23, change "solybdenum" to --molybdenum--.

Signed and Sealed this

Thirtieth Day of August 1983

[SEAL]

Attest:

Attesting Officer

GERALD J. MOSSINGHOFF

Commissioner of Patents and Trademarks